March 15, 1932.  W. F. NIEMANN  1,849,201
PIPE CLEANING MACHINE
Filed Sept. 15, 1930   2 Sheets-Sheet 1

WILLIAM F. NIEMANN
INVENTOR
ATTORNEY

March 15, 1932.  W. F. NIEMANN  1,849,201
PIPE CLEANING MACHINE
Filed Sept. 15, 1930   2 Sheets-Sheet 2
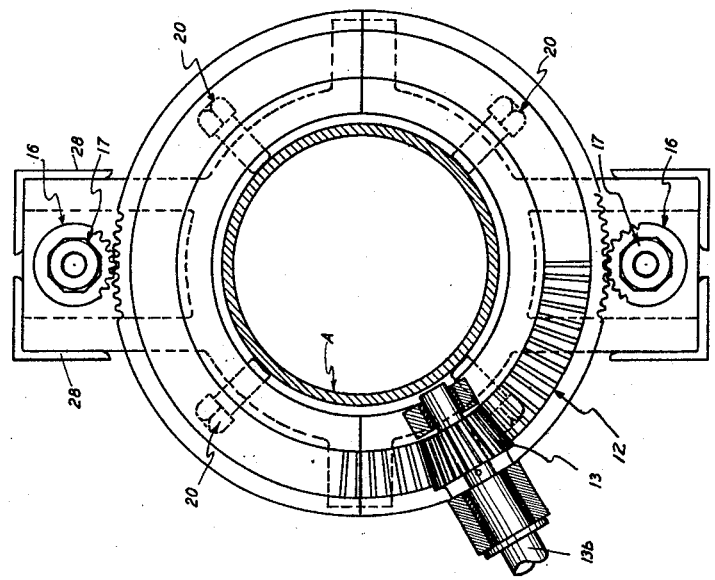
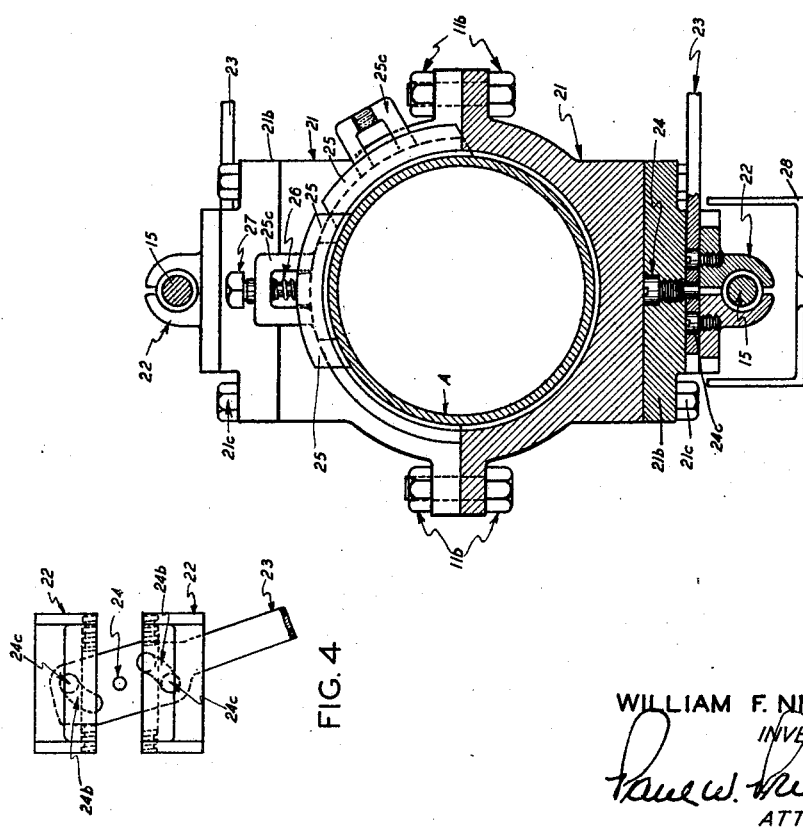
WILLIAM F. NIEMANN
INVENTOR
ATTORNEY Patented Mar. 15, 1932

1,849,201

UNITED STATES PATENT OFFICE

WILLIAM F. NIEMANN, OF LOS ANGELES, CALIFORNIA

PIPE CLEANING MACHINE

Application filed September 15, 1930. Serial No. 481,866.

The object of my invention is to provide a means for cheaply and expeditiously freeing the outer surface of pipe from accumulations of scale, rust, hardened earth or asphalt. The device of my invention is particularly adapted to the cleaning of pipes of large diameter and may be used either on separated joints of pipe, as in a pipe yard, or on pipe lines in place.

As shown in the appended drawings, the device may be separated longitudinally and may thus be applied to a pipe in a trench, as for instance a pipe line which requires repainting, thus saving the cost of disjointing the pipe. If used in a pipe yard, where the pipe is necessarily already disjointed, the machine may be mounted permanently and the pipe joints fed through it from an end without opening the machine.

In the attached drawings and the following description thereof:

Fig. 2 is an elevattion of the left end of Fig. 1.

Fig. 3 is an end view of the knife carriage, the upper half being shown in elevation and the lower half in cross section, and Fig. 4 is a detail of the carriage feed release indicated at 23 in Fig. 3.

Figure 1:
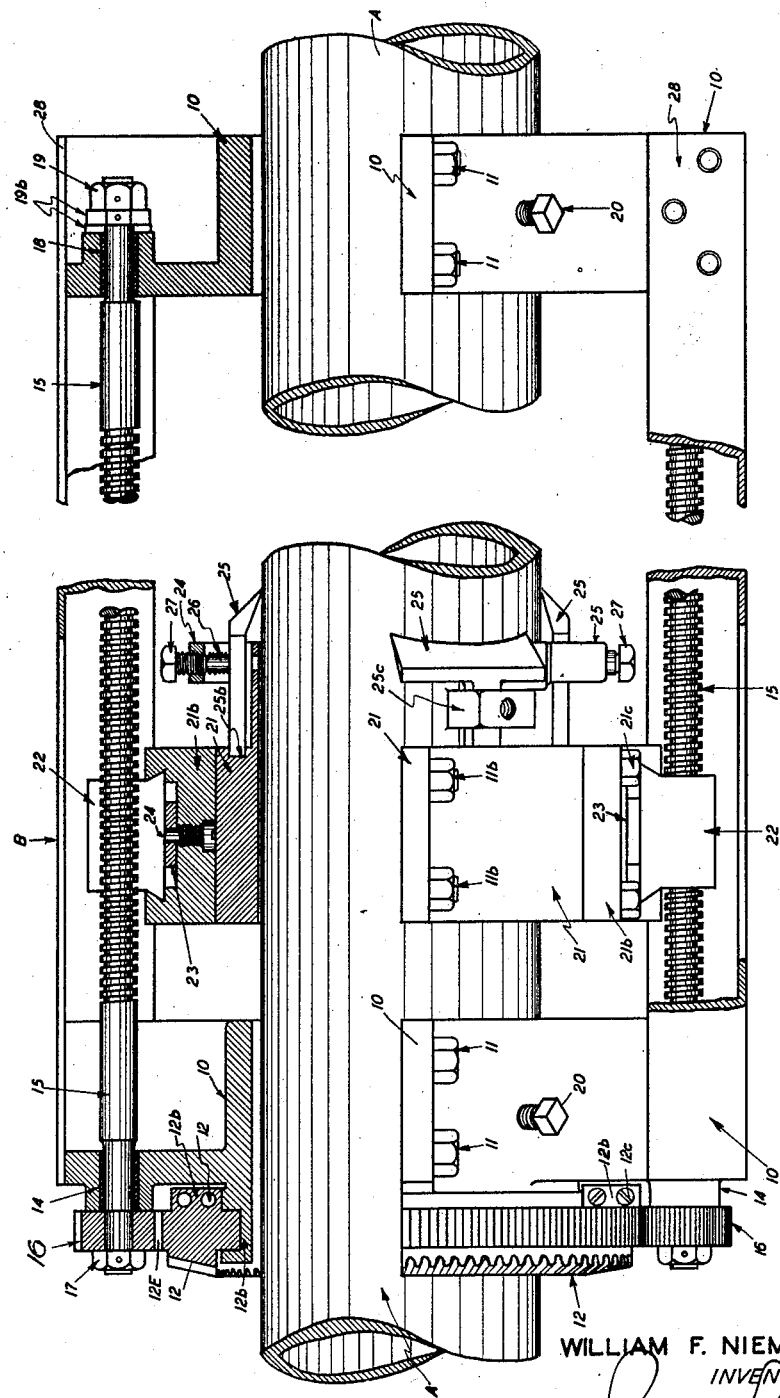
Fig. 1 is a longitudinal view of the machine from the side, the lower half being shown in elevation and the upper in section.

Referring to the figures, 10 is a frame divided longitudinally into halves fastened together by the bolts 11. One end of this frame supports a bevel gear 12 which is driven by a bevel pinion 13. The bearings by which this pinion is supported are integral with or made fast to the frame 10 and the pinion is driven through a shaft 13b from any convenient source of power not shown. In case the machine is portable, as for use on pipe lines, the prime mover may be mounted on the frame or the power may be conveyed to the pinion shaft 13b through a flexible shaft.

The gear 12 is divided into halves which are provided with mating lugs 12b and are assembled by means of the screws 12c into a continuous ring. The ring thus formed is journalled in a groove 12b formed in the end of frame 10. On revolving this gear until the joint is horizontal and removing screws 12c the frame may be separated by removing bolts 11 and the halves of the gear will remain in the respective halves of the frame.

The bevel gear 12 also has spur gear teeth 12E formed on its circumferential face. A pair of feed screws 15 are supported at their left end by projections 14 from the left end of the frame and carry spur gear 16 which mesh with the teeth 12E and are retained by lock nuts 17. At their opposite or right end the lead screws are supported by projections 18 and are restrained against end movement by lock nuts 19 and washers 19b.

The frame is locked to the pipe, a section of which is indicated at A, by means of set screws 20, of which three or more may be provided at each end of the frame. A clearance sufficient to enable the end blocks of the frame as well as the carriage block to slide over a pipe collar may be allowed and the pipe may be centered as well as locked by means of these set screws.

The knife carriage shown in Fig. 3 and at B in Fig. 1 consists first of two blocks 21 loosely encircling the pipe A and fastened together by means of bolts 11b. To these blocks the sub-blocks 21b are made fast by bolts 21c. Into these blocks are grooved the feed nuts 22 which, as shown in Fig. 3, are formed in mating halves adapted to clasp about the feed screw 15. A hand lever 23 pivoted on a screw pipe 24 is provided with arcuate grooves 24b engaging the heads of screws 24c. On a movement of the lever in a horizontal plane the grooves acting on the screw heads draw the halves of the feed nut 22 into engagement with the threads of feed screw 15 or vice versa.

The knives 25 are formed to fit the curvature of the pipe A and are supported in such manner as to be positively driven forward by blocks 21, as by means of the recess 25b and the slotted lug 25c (Fig. 1) which latter is integral with the block 21. The knives are pressed against the pipe by stiff springs 26, the tension of which may be adjusted by the screws 27. A plurality of knives is provided, enough to completely encircle the pipe and of such length as to slightly overlap, for this purpose the edges of the knives being arranged in two or more circles.

The L shaped straps indicated at 28 serve at once to connect and space the two fixed ends of the machine and to act as guards for the feed screws.

The device of my invention is operated as follows. First, the lever 23 is thrown into such position as to separate the halves of the feed nuts 22 and the block 21 carrying these nuts is moved to the left as far as it will go within the frame. The set screws 20 are also backed up until their pivots are withdrawn into the end blocks 10.

If a separated joint of pipe is to be cleaned it is now inserted from either end of the machine and its left end centered and firmly clamped in the left end of the device by adjusting set screws 20. If the pipe is in place, as in a pipe line, so that a free end is not available, the machine is separated into halves by withdrawing bolts 11 and 11b and screws 12c and thus assembled around the pipe. Lever 23 is then moved in such direction as to clamp feed nuts 22 about feed screw 15.

The right hand end of the machine having been clamped to the pipe, the left or driving end is similarly centered and clamped. Pinion shaft 13b is now rotated left hand, driving bevel gear 12 right handed, this gear in turn rotating feed gears 16 left handed.

By this rotation of the gears 16 and the attached feed screws 15 the carriage is forced to the right, carrying with it the knives 25 which, being pressed against the pipe by the springs 26, follow the surface of the metal and remove all scale or other adherent material.

When the carriage reaches the right end of the frame the revolution of the drive pinion 13b is stopped, the feed nuts 22 released from the feed screws, the set screws 20 released from the pipe and, without moving the carriage, the frame is moved to the right until the carriage is again at the left end of the frame. The set screws are then again tightened and the feed screws again revolved to clean another section of pipe as above described.

When a collar is reached in cleaning a pipe line the screws 27 may be backed out sufficiently to allow the knives to pass over the collar, which will pass through the end blocks of the frame when advancing it at the end of a cut.

I claim as my invention:

1. A pipe cleaning machine comprising a frame, means to secure the frame to a pipe so as to secure said pipe against rotation with respect thereto; a pair of feed screws at opposite sides of said frame and revolvable therein; means for revolving said feed screws; a carriage adapted to surround said pipe and to be moved longitudinally thereon by means of said feed screws; means for engaging and for releasing the operative connection between said feed screws and said carriage, and a plurality of scraping knives affixed to said carriage their edges being turned substantially at right angles to the longitudinal axis of the pipe and overlapped so that the entire pipe circumference is touched by knife edges.

2. A pipe cleaning machine comprising: a frame having means to immovably affix the same to a pipe; a carriage surrounding said pipe within said frame; a plurality of scraping knives affixed to said carriage, the cutting edges thereof being substantially at right angles to the longitudinal axis of the pipe and overlapping to touch the entire circumference of the pipe, and means for moving said carriage longitudinally within said frame.

In witness that I claim the foregoing I have hereunto subscribed my name this 5th day of September, 1930.

WILLIAM F. NIEMANN.